(12) United States Patent  (10) Patent No.: US 7,405,734 B2
Foran  (45) Date of Patent: Jul. 29, 2008

(54) METHOD AND SYSTEM FOR PRESENTING THREE-DIMENSIONAL COMPUTER GRAPHICS IMAGES USING MULTIPLE GRAPHICS PROCESSING UNITS

(75) Inventor: James L Foran, San Jose, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 293 days.

(21) Appl. No.: 09/888,438

(22) Filed: Jun. 26, 2001

(65) Prior Publication Data

US 2002/0015055 A1  Feb. 7, 2002

Related U.S. Application Data

(60) Provisional application No. 60/219,006, filed on Jul. 18, 2000.

(51) Int. Cl.
*G06F 15/16* (2006.01)
*G06T 17/00* (2006.01)

(52) U.S. Cl. ...................... 345/502; 345/424
(58) Field of Classification Search ............... 345/419, 345/505, 503, 424, 421, 506
See application file for complete search history.

(56) References Cited

U.S. PATENT DOCUMENTS

| | | | |
|---|---|---|---|
| 4,949,280 A | | 8/1990 | Littlefield |
| 5,101,475 A | * | 3/1992 | Kaufman et al. ............. 345/424 |
| 5,187,660 A | * | 2/1993 | Civanlar et al. ............. 345/424 |
| 5,363,475 A | * | 11/1994 | Baker et al. ................. 345/422 |
| 5,434,968 A | | 7/1995 | Kunii et al. |
| 5,459,823 A | | 10/1995 | Silverbrook et al. ........ 345/592 |
| 5,511,154 A | * | 4/1996 | Johnson et al. ............. 345/532 |
| 5,544,283 A | * | 8/1996 | Kaufman et al. ............ 345/424 |
| 5,546,530 A | * | 8/1996 | Grimaud et al. ............. 345/505 |
| 5,557,711 A | | 9/1996 | Malzbender |
| 5,640,496 A | | 6/1997 | Hardy et al. ................. 395/121 |

(Continued)

FOREIGN PATENT DOCUMENTS

EP  0 627 700 A2  12/1994

(Continued)

OTHER PUBLICATIONS

International Search Report for Appln. No. PCT/US01/22301, issued Mar. 4, 2002, 7 pages.

(Continued)

*Primary Examiner*—Ryan Yang
(74) *Attorney, Agent, or Firm*—Sterne, Kessler, Goldstein & Fox PLLC

(57) ABSTRACT

The present invention provides a method and system for presenting three-dimensional computer graphics images using multiple graphics processing units. The dimensions of the scene to be rendered are bounded by a rectangular volume decomposed into rectangular subvolumes. Vertices of graphics primitives are compared with subvolume boundaries to determine to which subvolume a graphics primitive should be assigned. A GPU is assigned to each subvolume to render the graphics data that lies within it. A viewing position point is determined and communicated to each GPU. Rendered graphics data from each GPU are ordered based upon the viewing position Outputs of the individual GPUs are combined by blending within an image combiners. Outputs of image combiners can be presented for viewing or further combined in a subsequent stage image combiner.

8 Claims, 6 Drawing Sheets

U.S. PATENT DOCUMENTS

| | | | | |
|---|---|---|---|---|
| 5,734,808 | A | * | 3/1998 | Takeda .................... 345/419 |
| 5,757,385 | A | * | 5/1998 | Narayanaswami et al. .. 345/505 |
| 5,760,781 | A | * | 6/1998 | Kaufman et al. ............ 345/424 |
| 5,764,228 | A | * | 6/1998 | Baldwin .................... 345/797 |
| 5,774,133 | A | * | 6/1998 | Neave et al. ................ 345/505 |
| 5,794,016 | A | * | 8/1998 | Kelleher .................... 345/505 |
| 5,841,444 | A | | 11/1998 | Mun et al. |
| 5,847,711 | A | * | 12/1998 | Kaufman et al. ............ 345/424 |
| 5,963,212 | A | * | 10/1999 | Bakalash .................... 345/424 |
| 6,008,813 | A | * | 12/1999 | Lauer et al. ................ 345/424 |
| 6,016,150 | A | | 1/2000 | Lengyel et al. ............. 345/426 |
| 6,052,129 | A | * | 4/2000 | Fowler et al. ............... 345/620 |
| 6,064,393 | A | | 5/2000 | Lengyel et al. ............. 345/427 |
| 6,100,899 | A | | 8/2000 | Ameline et al. ............. 345/605 |
| 6,243,098 | B1 | * | 6/2001 | Lauer et al. ................ 345/424 |
| 6,246,421 | B1 | * | 6/2001 | Omori ....................... 345/505 |
| 6,339,432 | B1 | | 1/2002 | Grossman .................. 345/639 |
| 6,532,017 | B1 | * | 3/2003 | Knittel et al. .............. 345/506 |
| 6,559,843 | B1 | * | 5/2003 | Hsu .......................... 345/421 |
| 6,570,579 | B1 | | 5/2003 | MacInnis et al. ........... 345/629 |
| 6,577,317 | B1 | * | 6/2003 | Duluk et al. ............... 345/506 |
| 6,587,110 | B1 | * | 7/2003 | Kunimatsu et al. ......... 345/502 |
| 6,597,363 | B1 | * | 7/2003 | Duluk et al. ............... 345/506 |
| 6,870,539 | B1 | | 3/2005 | Bower ....................... 345/506 |
| 6,903,753 | B1 | | 6/2005 | Gray et al. ................. 345/634 |
| 2001/0036356 | A1 | | 11/2001 | Weaver et al. ................ 386/52 |
| 2002/0130889 | A1 | | 9/2002 | Blythe et al. ................ 345/679 |
| 2003/0025699 | A1 | | 2/2003 | Wei et al. ................... 345/505 |
| 2004/0021659 | A1 | | 2/2004 | Peercy et al. ................ 345/418 |

FOREIGN PATENT DOCUMENTS

EP  0 627 700 A3  12/1994

OTHER PUBLICATIONS

Bartz, D. and Meiβner, M., "Voxels versus Polygons: A Comparative Approach for Volume Graphics," To appear in *Volume Graphics '99 proceedings*, 14 pages.

Kaufman, A., et al., "Volume Graphics," *IEEE Computer*, vol. 26, No. 7, pp. 51-64, Jul. 1993, printed Mar. 22, 2004, from www.cs.sunysb.edu/~vislab/projects/volume/Papers/, 16 pages.

Kaufman, A., et al., "Volume Graphics Sidebar: Fundamentals of Voxelization," *IEEE Computer*, vol. 26, No. 7, pp. 51-64, Jul. 1993, printed Mar. 22, 2004 from www.cs.sunysb.edu/~vislab/projects/volume/Papers/Voxel/index.html, 4 pages.

Kaufman, A., et al., "Volume Graphics Sidebar: Glossary," *IEEE Computer*, vol. 26, No. 7, pp. 51-64, Jul. 1993, printed Mar. 30, 2004 from www.cs.sunysb.edu/~vislab/projects/volume/Papers/glossary.html, 2 pages.

"Voxels, volume rendering and volume graphics," printed Mar. 22, 2004 from www.volumegraphics.com/solutions/voxels.html © 2001-2004, 2 pages.

\* cited by examiner

METHOD AND SYSTEM FOR PRESENTING THREE-DIMENSIONAL COMPUTER GRAPHICS IMAGES USING MULTIPLE GRAPHICS PROCESSING UNITS

This application claims the benefit of U.S. Provisional Application No. 60/219,006, filed Jul. 18, 2000.

BACKGROUND OF THE INVENTION

1. Field of the Invention

The present invention relates to computer graphics technology.

2. Related Art

As with any type of information processing, computer graphics rendering as used for viewing a static data base has long been the subject of attempts to improve performance. Since the commoditization of computer graphic processing chips for personal computers, one method that has become particularly attractive is to use multiple numbers of these powerful (yet inexpensive) graphic processing units (GPUs) to render a single scene. Although in the archetypical rendering application, the graphic data move from frame to frame under the user's interactive control, a significant number of graphic applications can be characterized as "viewers".

In these applications, the data have been pregenerated such that their three-dimensional positions in space are not under the interactive control of the user. However, in a viewer application the user does have interactive control of the viewer's position, the direction of view, and the scale of the graphic data. The user also may have control of the selection of a subset of the data and the method by which it is rendered. This includes the effects of lighting, coloration, and other visual characteristics of the underlying data.

There are two predominant methods for rendering graphic data with multiple GPUs. These include time domain composition, in which each GPU renders the next successive frame, and screen space composition, in which each GPU renders a subset of the pixels of each frame.

Time domain composition has the disadvantage of having each GPU render an entire frame. Thus, the speed at which each frame is rendered is limited to the rendering rate of a single GPU. While multiple GPUs enable a higher frame rate, a delay can be imparted in the response time of the system to a user's input. This occurs because, while at any given time only one GPU is engaged in displaying a rendered frame, each of the GPUs is in the process of rendering one of a series of frames in a sequence. To maintain the high frame rate, the system delays acting on the user's input until the specific GPU that first received the signal cycles through the sequence and is again engaged in displaying its rendered frame. In practical applications, this condition serves to limit the number of GPUs that are used in a system. With large data sets another problem is that each GPU must be able to access all of the data. This requires either maintaining multiple copies of large data sets or possible conflicts in accessing the single copy.

Screen space composition has a similar problem with large data sets since each GPU must examine the entire data base to determine which graphic elements fall within its part of the screen.

These problems can become intractable as commercial graphics chips become limited by their ability to access data rather than by their ability to render graphic elements.

One method which allows each GPU to access only a part of the data base is depth composition. Using this method each GPU renders the entire screen and produces both a Z (or depth) buffer and a color buffer. Graphic elements are distributed to GPUs by some hueristic, which is designed to acheive good load balancing. At each pixel the depth values from each of the GPUs are compared and the value indicating the frontmost position is selected. Use of this method is inhibited by the fact that the commodity graphic parts do not output the depth values, which are internally generated. It also requires that the depth buffer be double buffered so that the next frame can be calculated while the current one is displayed. Otherwise performance is effected. This method also prevents the application of some features, such as antialiasing or transparency, which require more information per pixel than just color and depth. Furthermore, volumetric data stored as three-dimensional textures or as geometricly specific textures (such as phototerrain) must be duplicated at each GPU.

What is needed is a method whereby multiple GPUs can, without a latency penalty, render a subset of graphic data from a data base to combine their outputs to form a correct image. This method should permit three-dimensional and other geometrically attached textures to be stored at a single place. Furthermore, such a method should be scalable, so that systems of arbitrary power can be created, and flexible, so that a system can be configured to support a single user at maximum power or multiple users with the total power distributed amongst them.

SUMMARY OF THE INVENTION

The present invention provides a method and system for viewing three-dimensional computer graphics using multiple graphics processing units (GPUs). The image to be produced represents a three-dimensional scene. The rectangular volume in which the scene resides is decomposed into subvolumes. Multiple GPUs are used, where each GPU is assigned to a different subvolume. The graphics data base is preloaded such that each GPU has access only to the data which is relevant to its subvolume. If a graphic element spans multiple subvolumes, then it is preloaded to each of them. Geometrically specific textures, such as three-dimensional texture, are only loaded to the GPUs for the subvolumes to which they correspond. An identical copy of the viewing application can be run on each GPU.

All control inputs from the user are sent to all GPUs. As the graphic elements of each subvolume are rendered, they are clipped to the subvolume boundaries to prevent artifacts. An alpha value is stored with each pixel. Initially, the frame buffer, including the alpha value, is cleared. As pixels are written to the frame buffer, the alpha value is updated accordingly. Alpha may represent "clear", "opaque", or transparent (translucent) as determined by its numeric value. Both the alpha value and the color frame buffer are double buffered.

Each GPU renders an image for the entire screen. The resultant image data that are output by the GPUs are combined using one or more image combiners to produce a final image. The image combiners can be cascaded to an arbitrary degree to achieve scalability. Each image combiner accepts the outputs of two neighboring subvolume GPUs. The combining operation is based on the alpha blending of the output of the frontmost GPUs over the output of the rearmost GPUs. Frontmost and rearmost positions are determined for each frame by the relationship between the subvolumes and the viewing position in three-dimensional space. The output of a single image combiner stage represents the image produced by the combined subvolumes and is used as the input to the next image combiner stage where it is matched with a similarly received output from a neighboring image combiner such that a scalable tree of image combiners can be configured. Where the number of GPUs to be combined exceeds a multiple of the number of GPU inputs a combiner can receive, remaining GPUs can bypass first stage combining and directly input image combiners at the next stage. The number of subvolumes does not have to be the same in each of the three dimensions nor do the dimensions of the subvolumes need to be equal in each of the three dimensions. Image combiners can be aggregated into more than two input units as desired.

The invention has the feature of decomposing the volume containing the scene to be viewed. The invention has the additional feature of providing an array of GPUs to perform the rendering operations. The invention has the additional advantage of scaling geometrically specific texture without the need for replication across all GPUs. The invention has the further advantage of being scalable with respect to the number of GPUs and image combiners that can be used. The invention has yet another advantage of being transparent to the application program. The program need not be modified to take advantage of the architecture described above or the scalability thereof.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

The preferred embodiments of the invention are described with reference to the figures where like reference numbers indicate identical or functionally similar elements. Also in the figures, the left most digit of each reference number identifies the figure in which the reference number is first used.

DETAILED DESCRIPTION OF THE PREFERRED EMBODIMENTS

Nomenclature

The present invention provides a method and system for presenting three-dimensional computer graphics images using multiple graphics processing units. The following section defines several terms that occur frequently throughout the application.

Graphics Processing Unit (GPU).

This refers to a device for rendering an image on the basis of received information, such as graphics primitives and texture data. The output of a GPU is rendered three-dimensional computer graphics data.

Image Combiner.

This refers to a device which takes the output of two or more sources of rendered three-dimensional computer graphics data and combines them. The combination process can take into account colors, opacity, and the relative depth of objects in a scene. The inputs to a combiner can come from a GPU or from another combiner. The output is rendered three-dimensional computer graphics data that is dependent on (i.e., a combination of) the inputs.

Memory Cell.

This refers to memory that stores data to be rendered by a GPU, and is accessible by that GPU.

Viewing Position.

This refers to the location in three-dimensional space of a point from which a rendered scene is viewed. Viewing position includes both the angle of the line of sight and the distance between the point and the rendered scene.

Operation

The present invention is a method and system for presenting three-dimensional computer graphics images using multiple GPUs. The present invention realizes a high degree of speed, fidelity, resolution, and scalability in the images that it renders by using multiple GPUs and cascading stages of image combiners. The present invention requires that the three-dimensional computer graphics data ("graphics data") undergo preliminary processing to prepare them for rendering by the multiple GPUs.

Figure 1:
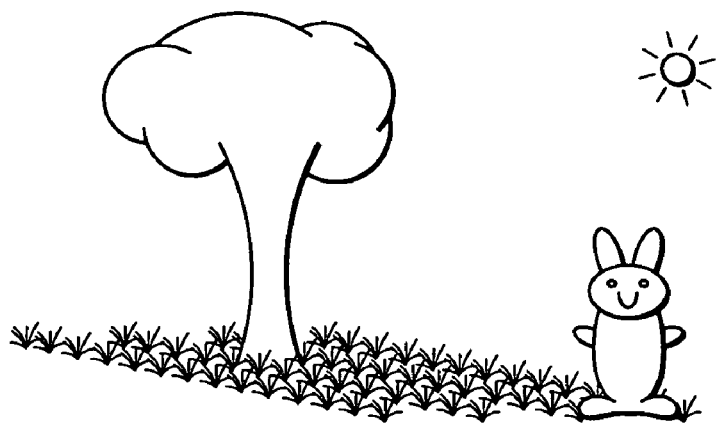
FIG. 1 presents a sample collection of objects that could appear in an image.

The image to be produced represents a three-dimensional scene. FIG. 1 presents a collection of objects that could appear in such a scene. The objects in this figure are included purely for example. The present invention can work with any objects that could be rendered in an image. One skilled in the art will recognize that such a three-dimensional scene could be the product of an application software program, information stored in a database, or other source for producing a digital image.

Figure 2:
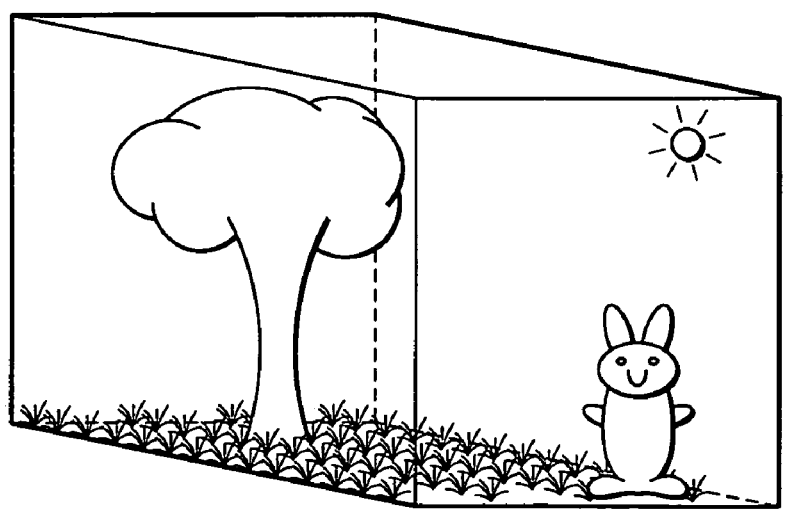
FIG. 2 shows the objects of FIG. 1 enclosed by a rectangular volume.
Figure 3:
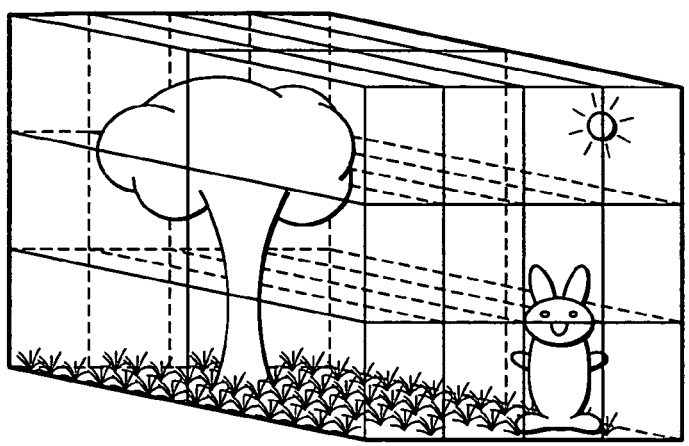
FIG. 3 shows the rectangular volume of FIG. 2 decomposed into rectangular subvolumes.

First, the dimensions of the scene are bounded by a rectangular volume as shown in FIG. 2. Next, this volume is decomposed into rectangular subvolumes as shown in FIG. 3 such that each subvolume includes a portion of the overall scene. The graphics data include graphics primitives and texture data. Each graphics primitive includes a set of vertices. The position of each vertex is compared with the positions of the planar sides of the subvolumes to determine the subvolume to which the graphics primitive should be assigned. Where vertices of a graphics primitive indicate that it spans a boundary between subvolumes, the graphics primitive will be assigned to each subvolume. Texture data are matched to the graphics primitives and assigned to the appropriate subvolumes. Finally, a GPU is assigned to each subvolume to render the graphics data that lie within the boundaries of that subvolume. Where parts of a graphics primitive exceed the boundaries of a subvolume, the GPU will clip that graphics primitive to the boundaries of the subvolume.

Figure 4:
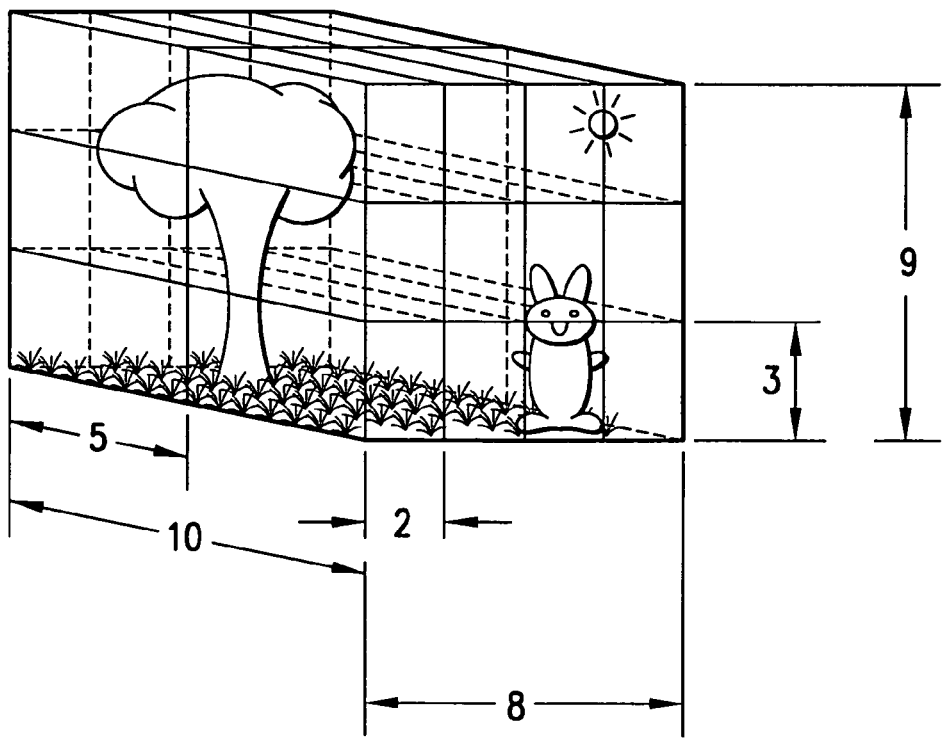
FIG. 4 add representative dimensions to the volume and subvolumes of FIG. 3.

Note that the dimensions of the sides of the rectangular volume or subvolumes do not need to equal one another. Additionally, the dimensions of the sides of the subvolume do not need to equal a scaled down version of the volume. FIG. 4 illustrates this freedom in dimension sizes. The volume shown in FIG. 4 measures 8×9×10, while the subvolume measures, along the same axes, 2×3×5.

Figure 5:
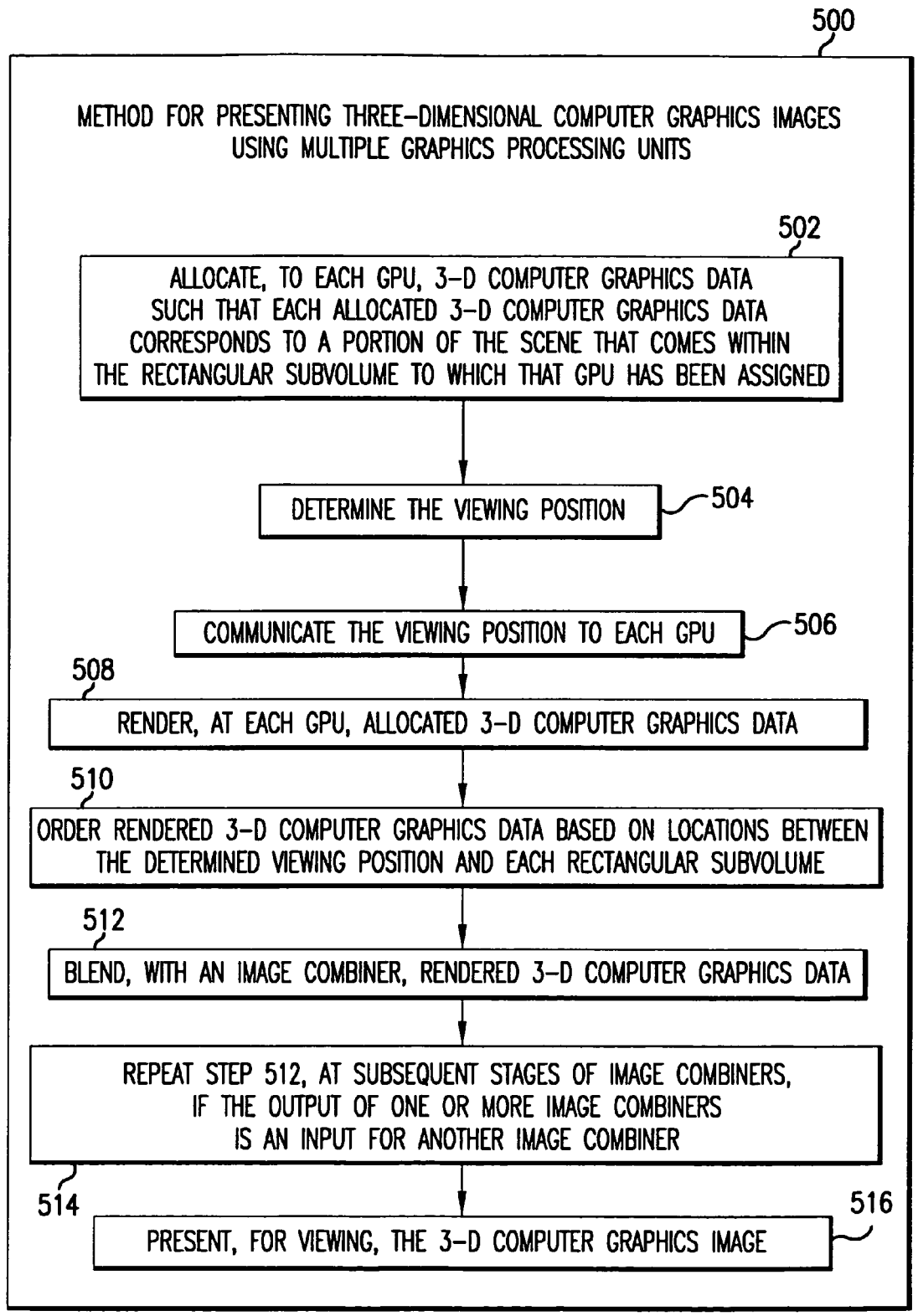
FIG. 5 presents a diagram of an embodiment of the present invention method.

The present invention will now be described by referencing the operational flow diagram shown in FIG. 5. In FIG. 5, at a step 502, the graphics data that correspond to each rectangular subvolume is allocated to the GPU assigned to that subvolume. Typically, allocation occurs by loading each set of allocated graphics data into a memory cell that is accessible only by the GPU to which the graphics data have been allocated. Alternatively, the graphics data can be stored in a common memory accessible by all GPUs with allocation achieved by controlling the distribution of addresses for the graphics data such that certain graphics data are accessible only by the GPU to which they have been allocated. One skilled in the art will recognize that there are other methods by which one could control the allocation of graphics data to the GPUs.

Figure 6:
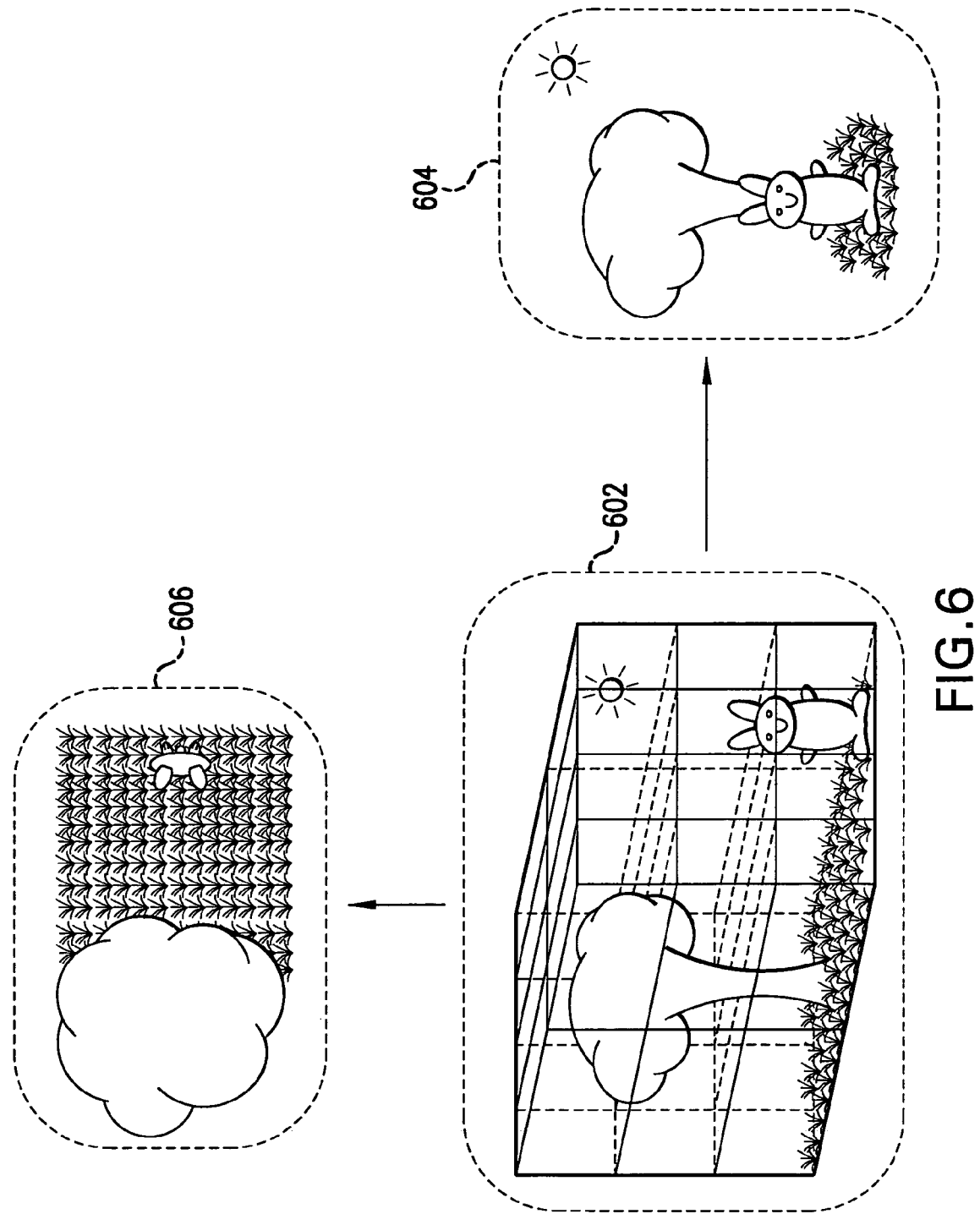
FIG. 6 demonstrates different viewing positions of the objects in the image of FIG. 4.

In FIG. 5, at a step 504, a viewing position is determined. The viewing position controls which aspect of the three-dimensional graphics data will be presented for viewing. FIG. 6 illustrates this point. Item 602 replicates the example scene originally presented in FIG. 1 with the rectangular subvolumes superimposed on it as shown in FIG. 3. FIG. 6 includes two other illustrations that demonstrate how the scene depicted in item 602 would appear from different viewing positions. Item 604 shows one viewing position. Note that from this angle part of the tree is obscured by the image of the rabbit. Item 604 demonstrates another viewing position. Note that from this "birds eye" view that both the tree and the rabbit are visible, but the trunk of the tree and parts of the body of the rabbit are not. The ability to view all aspects of the scene by changing the viewing position is an advantage of the present invention. The viewing position can be determined by the application software either automatically or interactively via a command entered by the user.

In FIG. 5, at a step 506, the viewing position is communicated to each GPU. At a step 508, each GPU renders the graphics data that has been allocated to it. The architecture of the present invention supports the possibility that each GPU could render, by itself, the full image. In one embodiment, pixels rendered include channels representing the primary colors of red, green, and blue and an alpha channel that indicates the degree of translucence for that pixel. Translucence can range from transparent to opaque.

In FIG. 5, at a step 510, the rendered graphics data from each GPU are ordered. Ordering optimizes the process by which the outputs of individual GPUs are combined. Ordering is determined by comparing the viewing position with the positions of each of the subvolumes. At a step 512, the outputs of the individuals GPUs are combined by blending. Image blending accounts for the spatial relationships between the viewing position and the rendered images so that objects that are more near the viewing position overwrite those that are more distant. Typically, image combining is performed using image combiners where each image combiner stores the results of its combining process in a frame buffer.

Depending upon the application being executed and the number of GPUs used, image combiners can be configured in cascading stages where the output of one or more image combiners provide inputs for another image combiner. This would entail further image combining as shown in FIG. 5 at a step 514. At the first stage, an image combiner receives the output of adjacent GPUs. In subsequent stages, an image combiner receives the output of one or more image combiners from a previous stage such that combined GPUs maintain their contiguous relationship. Where the number of GPUs to be combined exceeds a multiple of the number of GPU inputs a combiner can receive, remaining GPUs can bypass first stage combining and directly input image combiners at the next stage.

An advantage of the present invention is its ability to scale the rendering and combining process to match the needs of the application being executed. An application requiring a high degree of resolution or fidelity can decompose the volume into more (and hence smaller) subvolumes. This would bring into service more GPUs such that the processing power of each GPU could be brought to bear on a smaller portion of the overall scene to be rendered. Alternatively, an application requiring a high speed of rendering could opt to use fewer GPUs and thus reduce the number of stages (and hence time) needed for image combining.

Figure 7:
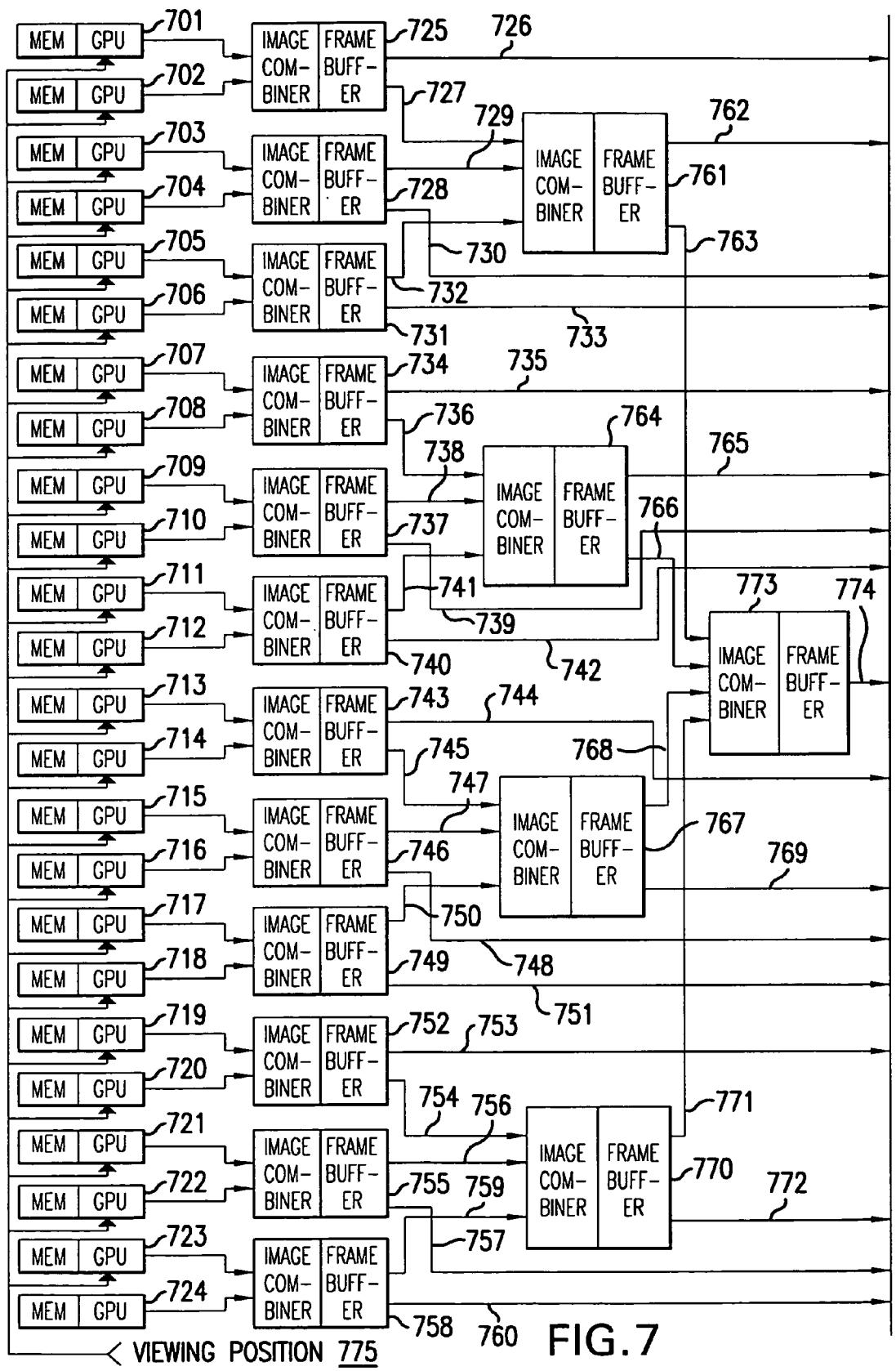
FIG. 7 presents a diagram showing an embodiment of the present invention system.

FIG. 7 illustrates this arrangement. In FIG. 7, images rendered by GPUs 701 and 702 are combined by image combiner 725. Depending upon the application, the output of image combiner 725 can be routed along bus 726 directly to an output device or along bus 727 to image combiner 761 for further combining. Image combiners can be designed to receive an arbitrary number of inputs. Note that in FIG. 7 image combiner 725 receives two inputs, one each from GPUs 701 and 702; image combiner 761 receives three inputs, one each from image combiners 725, 728, and 731; and image combiner 773 receives four inputs, one each from image combiners 761, 764, 767, and 770. The output of each image combiner can be routed directly to an output device or to another image combiner. This provides flexibility in the architecture to support scaling.

Returning to FIG. 5, at a step 516, the three-dimensional computer graphics image is presented for viewing.

Environment of the Invention

Figure 8:
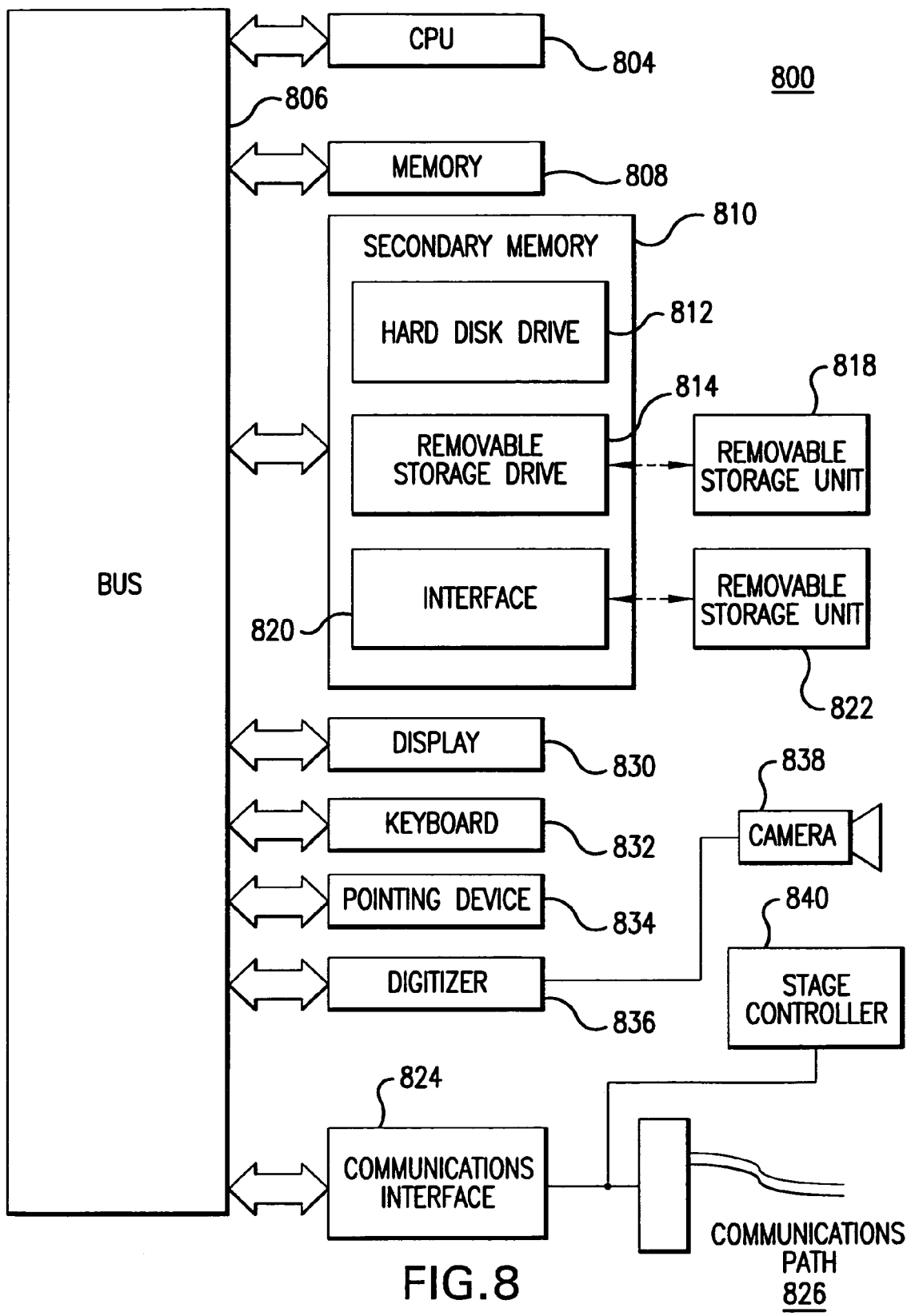
FIG. 8 is a diagram illustrating an example environment in which the present invention can operate.

FIG. 8 is a block diagram illustrating an example environment in which the present invention can operate. The environment is a computer system 800 that includes one or more processors, such as a central processing unit (CPU) 804. The CPU 804 is connected to a communications bus 806. Various software embodiments are described in terms of this example computer system. After reading this description, it will be apparent to a person skilled in the relevant art how to implement the invention using other computer systems and/or computer architectures.

Computer system 800 also includes a main memory 808, preferably random access memory (RAM), and can also include a secondary memory 810. The secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818 represents a floppy disk, magnetic tape, optical disk, etc., which is read by and written to by removable storage drive 814. As will be appreciated, the removable storage unit 818 includes a computer usable storage medium having stored therein computer software and/or data.

The computer system 800 also includes conventional hardware such as a display 830, a keyboard 832, and a pointing device 834. A digitizer 836 and a camera 838 can be used for capturing images to process according to the present invention. Alternatively, images can be retrieved from any of the above-mentioned memory units, or via a communications interface 824.

In alternative embodiments, secondary memory 810 may include other similar means for allowing computer programs or other instructions to be loaded into computer system 800. Such means can include, for example, a removable storage unit 822 and an interface 820. Examples can include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

The communications interface 824 allows software and data to be transferred between computer system 800 and external devices via communications path 826. Examples of communications interface 824 can include a modem, a network interface (such as an Ethernet card), a communications port (e.g., RS-232), etc. Software and data transferred via communications interface 824 are in the form of signals which can be electronic, electromagnetic, optical or other signals capable of being received by communications interface 824 via communications path 826. Note that communications interface 824 provides a means by which computer system 800 can interface to a network such as the Internet. According to a preferred embodiment of the present invention, the communications interface 824 can send control signals to the color digital camera and data from the color digital camera can be transferred back to the computer system 800. This interface can be parallel, serial, bi- or unidirectional.

The present invention is described in terms of this example environment. Description in these terms is provided for convenience only. It is not intended that the invention be limited to application in this example environment. In fact, after reading the complete description, it will become apparent to a person skilled in the relevant art how to implement the invention in alternative environments.

Software and Hardware Embodiments

The present invention is preferably implemented using software running (that is, executing) in an environment similar to that described above with respect to FIG. 8. In this document, the term "computer program product" is used to generally refer to removable storage device 818 or a hard disk installed in hard disk drive 812. These computer program products are means for providing software to computer system 800.

Computer programs (also called computer control logic) are stored in main memory and/or secondary memory 810. Computer programs can also be received via communications interface 824. Such computer programs, when executed, enable the computer system 800 to perform the features of the present invention as discussed herein. In particular, the computer programs, when executed, enable the processor 804 to perform the features of the present invention. Accordingly, such computer programs represent controllers of the computer system 800.

In an embodiment where the invention is implemented using software, the software may be stored in a computer program product and loaded into computer system 800 using removable storage drive 814, hard drive 812 or communications interface 824. Alternatively, the computer program product may be downloaded to computer system 800 over communications path 826. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of a hardware state machine so as to perform the functions described herein will be apparent to persons skilled in the relevant art(s).

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for presenting three-dimensional computer graphics images using multiple graphics processing units, comprising the steps of:
    (1) allocating three-dimensional computer graphics data to rectangular subvolumes that define a scene such that said allocated three-dimensional computer graphics data corresponds to a portion of the scene that lies within the rectangular subvolumes to which the multiple graphics processing units have been assigned;
    (2) rendering, by the multiple graphics processing units, said allocated three-dimensional computer graphics data;
    (3) combining said rendered three-dimensional computer graphics data, thereby producing a three-dimensional computer graphics image; and
    (4) selecting one of presenting a first set of said combined three-dimensional computer graphics data and combining, at a second stage image combiner, the first set of said combined three-dimensional computer graphics data received directly from a first first stage image combiner with a second set of said combined three-dimensional computer graphics data received directly from a second first stage image combiner.

2. The method of claim 1, further comprising, before step (2), the steps of:
    (5) determining a viewing position.

3. The method of claim 2, wherein said combining further comprises the step of:
    (6) ordering said rendered three-dimensional computer graphics data based on locations between said determined viewing position and the rectangular subvolumes.

4. The method of claim 1, wherein said combining further comprises the step of:
    (5) blending said rendered three-dimensional computer graphics data.

5. A system for presenting three-dimensional computer graphics images, comprising:
    memory configured to store three-dimensional computer graphics data;
    at least one graphics processing unit configured to render a portion of the three-dimensional computer graphics data that corresponds to rectangular subvolumes to which said at least one graphics processing unit is assigned;
    a bus configured to communicate a viewing position to each of said at least one graphics processing unit; and
    at least one image combiner configured to combine the three-dimensional computer graphics data rendered by said at least one graphics processing unit to produce a three-dimensional computer graphics image;
    wherein at least two first stage image combiners of said image combiners are configured to be selectively coupled directly to one of an output device and a second stage image combiner of said image combiners.

6. The system of claim 5, wherein said memory comprises memory cells such that each of said memory cells is accessible by only one of said at least one graphics processing unit.

7. A method for presenting three-dimensional computer graphics images, comprising the steps of:
    (1) allocating three-dimensional computer graphics data to rectangular subvolumes that define a scene;
    (2) rendering said allocated three-dimensional computer graphics data;

(3) combining a first set of said rendered three-dimensional computer graphics data and a second set of said rendered three-dimensional computer graphics data; and (4) selecting one of presenting a first set of said combined three-dimensional computer graphics data and combining, at a second stage combiner, the first set of said combined three-dimensional computer graphics data received directly from a first first stage combiner with a second set of said combined three-dimensional computer graphics data received directly from a second first stage combiner.

8. A system for presenting three-dimensional computer graphics images, comprising:

memory configured to store three-dimensional computer graphics data;

graphics processing units configured to render portions of the three-dimensional computer graphics data that correspond to rectangular subvolumes to which said graphics processing units are assigned;

a bus configured to communicate a viewing position to each of said graphics processing units; and combiners configured to combine the three-dimensional computer graphics data rendered by said graphics processing units to produce a three-dimensional computer graphics image;

wherein at least two first stage combiners of said combiners are configured to be selectively coupled directly to one of an output device and a second stage combiner of said combiners.

* * * * *